(12) United States Patent
Callaci

(10) Patent No.: US 6,700,601 B1
(45) Date of Patent: Mar. 2, 2004

(54) METHOD AND APPARATUS FOR VIDEO COMMUNICATION OVER A LIMITED BANDWIDTH MEDIUM

(75) Inventor: John W. Callaci, Diamond Bar, CA (US)

(73) Assignee: JPS International, Inc., Las Vegas, NV (US)

( * ) Notice: Subject to any disclaimer, the term of this patent is extended or adjusted under 35 U.S.C. 154(b) by 177 days.

(21) Appl. No.: 09/927,132

(22) Filed: Aug. 10, 2001

Related U.S. Application Data

(60) Provisional application No. 60/224,254, filed on Aug. 10, 2000.

(51) Int. Cl.$^7$ ................................................ H04N 7/14
(52) U.S. Cl. .................................. 348/14.12; 348/384.1
(58) Field of Search ........................... 348/14.01–14.14, 348/384.1, 390.1, 401.1, 409.1, 438.1, 439.1, 412.1, 413.1, 415.1, 416.1

(56) References Cited

U.S. PATENT DOCUMENTS 5,506,624 A * 4/1996 Moreton .................. 348/14.15
5,835,147 A * 11/1998 Florentin et al.

FOREIGN PATENT DOCUMENTS

| EP | 0 666 687 | * | 8/1995 |
| JP | 01-272280 | | 10/1989 |
| JP | 2001-177837 | | 6/2001 |

OTHER PUBLICATIONS

International Search Report for International Application No. PCT/US02/25356, dated Feb. 14, 2003.

* cited by examiner

*Primary Examiner*—Wing Chan
(74) *Attorney, Agent, or Firm*—Knobbe, Martens, Olson & Bear LLP

(57) ABSTRACT

A method and apparatus for creating intermediate image frames based on two or more successive captured image frames for transmission over a limited bandwidth medium, such as a telephone line. The intermediate image frames are constructed based on pixel information of portions that did change between two consecutive frames. The intermediate frames are constructed without the necessity of creating portions of the successive image frames that did not move or change. The created intermediate frames may be combined with originally captured frames to convey live video information to a user.

20 Claims, 9 Drawing Sheets

METHOD AND APPARATUS FOR VIDEO COMMUNICATION OVER A LIMITED BANDWIDTH MEDIUM

RELATED APPLICATION

This application claims priority to a pending provisional application entitled "SYSTEM, APPARATUS AND METHOD FOR TRANSMISSION OF VIDEO ACROSS LIMITED BANDWIDTH TRANSMISSION MEDIA", having application Ser. No. 60/224,254, and which was filed on Aug. 10, 2000.

BACKGROUND OF THE INVENTION

1. Field of the Invention

The invention relates generally to a communications system that communicate data over narrow or limited bandwidth medium. More particularly, the invention relates to a method and apparatus for transmission of video over narrow-band transmission channels, such as plain old telephone system (POTS) lines.

II. Description of the Related Art

Video telephones have existed within the marketplace for several years with little commercial success. The lack of success of videophones is attributable in part to the fact that they do not work very well. It has been problematic to transmit sound and video of acceptable quality across existing phone lines.

Some available video conferencing systems produce acceptable video and audio quality, and have met with some commercial success. Those video conferencing systems depend on wide bandwidth communication connections such as leased lines, ISDN (Integrated Services Digital Network), DSL (Digital Subscriber Lines) and the like. The high bandwidth is necessary to produce acceptable audio and video quality.

The available bandwidth on standard telephone lines has been too low to support industry standard 30 frames per second video. Currently, using compression, the best performance obtainable on standard U.S. phone lines is approximately 15 video frames per second in one direction. Because 15 video frames per second is less than the persistence of the human eye, which is generally about 24 frames per second, the 15 video frames per second results in a jerky unacceptable video quality. Even with expensive compression hardware, the quality of the resultant video may be unacceptable.

There is therefore a need for video communication systems, which do not depend on expensive compression hardware and yet yield an acceptable video display when transmitted bi-directionally across standard analog phone lines.

SUMMARY OF THE INVENTION

The invention provides an apparatus for creating at least one intermediate image frame based on at least two image frames in a video communications system. In one embodiment, the apparatus comprises a video device that is configured to capture a first image frame of an object, and further configured to capture a second image frame of the object after a defined period of time from the time the first image frame is captured. The apparatus further comprises a memory, electrically connected to the video device, the memory being configured to store pixel information related to the first and second image frames. The apparatus further comprises a processor, electrically connected to the memory, that is configured to identify a portion of the second image frame, provided that the identified portion was changed during the period of time. The processor is further configured to determine a location of an intermediate image portion based on at least the average respective locations of the identified portion and its corresponding portion in the first frame.

In another embodiment, the apparatus comprises first means for capturing a first image frame of an object. The apparatus further comprises second means for capturing a second image frame of the object after a defined period of time from the time the first image frame is captured. The apparatus further comprises means for identifying a portion of the second image frame, provided that the identified portion was changed during the period of time. The apparatus further comprises means for determining a location of an intermediate image portion based on at least the average respective locations of the identified portion and its corresponding portion in the first frame.

In another embodiment, the invention provides a method of creating at least one intermediate image frame based on at least two image frames in a video communications system. The method comprises capturing a first image frame of an object, and capturing a second image frame of the object after a defined period of time from the time the first image frame is captured. The method further comprises identifying a portion of the second image frame, provided that the identified portion was changed during the period of time. The method further comprises determining a location of an intermediate image portion based on at least the average respective locations of the identified portion and its corresponding portion in the first frame.

BRIEF DESCRIPTION OF THE DRAWINGS

The features, objectives, and advantages of the invention will become more apparent from the detailed description set forth below when taken in conjunction with the drawings wherein like parts are identified with like reference numerals throughout, and wherein.

DETAILED DESCRIPTION OF THE INVENTION

Figure 1:
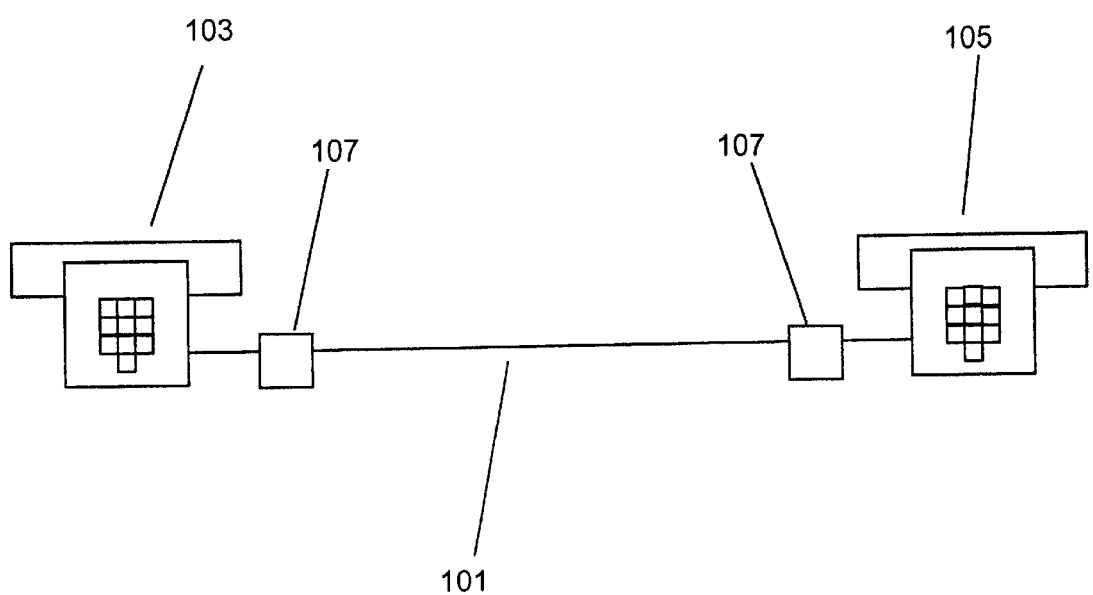
FIG. 1 shows a standard telephone system communicating voice over telephone lines.

The present invention comprises methods and apparatus for reducing bandwidth requirements for video transmission, and at the same time producing bi-directional audio and video transmission across a standard phone line.

Embodiments of the present invention also minimize the objectionable jerkiness which has plagued many previous video communication systems.

The first step in creating an acceptable bi-directional video transmission is to select a standardized frame rate. For the purposes of illustration of the inventive concepts herein a 5 frame per second (in each direction) transmission rate is chosen. Five frames per second sill allow for bi-directional video and audio transmission across standard telephone lines. Since only 5 frames are sent per second at the sending end, intermediate frames are recreated at the receiving end. If five frames per second are received at the receiving end and additional 25 frames per second must be created in order to meet a 30 frame per second target frame rate.

The first step in creating intermediate frames is to examine a subset of successive frames to determine which elements (pixels) within the successive frames do not change. The elements, which do not change, need only be transmitted once, and then the areas, which do not change, may be used to recreate successive frames, without having to retransmit the same information for each frame. By identifying the elements that do no change, conversely the elements, which do change, are identified. A picture element, which does change, can have its position tracked across several successive frames. Once the changing position is known across several frames, an equation for the motion of that element across several frames can be developed. Generally it is easier to compute the motion across successive frames using a polar coordinate system. This is so because objects more naturally travel in arcs and curved motion than in rectangular coordinate type motion. Of course since one coordinate system can be transformed to another, either coordinate system may be used. Once the equation for motion across several different received frames has been computed, it can be utilized to project the motion between successive frames. Because a point does not move by itself, the point can be used to trace the motion of objects containing that point.

Various approximations can be used to track the motion of objects between received frames. Once the equation of motion has been found over several frames, the portions of the transmitted image that do change may be recreated between transmitted frames using the motion equation. Because the motion between received frames is being governed by a mathematical equation, jerkiness that is commonly associated with the transmission of individualized frames is greatly reduced.

Even if the motion that is predicted by the motion equations is slightly different than the actual motion, the amount of error between successive frames is small and is generally not perceived by the eye. In addition the mathematical relationship between successively created frames has a tendency to assure that the motion is smooth and the resultant video will appear acceptable without the jerky artifacts commonly associated with such video across phone line transmissions.

FIG. 1 represents a standard telephone system. 101 is an analog telephone line connecting a first telephone 103 to a second telephone 105. Typically telephone companies insert programmable filters 107 within telephone lines. The function of these analog filters is to control the bandwidth of the telephone line. Typically a phone line may be controlled to a bandwidth of 18 KHZ. The bandwidth of this type of filter, 107, can be programmed by sending a tone across the telephone line thereby commanding the filter to a certain bandwidth. In such a manner the bandwidth of the telephone line can be controlled. The maximum bandwidth that is available on an analog telephone line is typically in the neighborhood of 35–48 Kilohertz. The filters 107, are often used to limit the telephone line bandwidth to be compatible with older existing systems.

Figure 2:
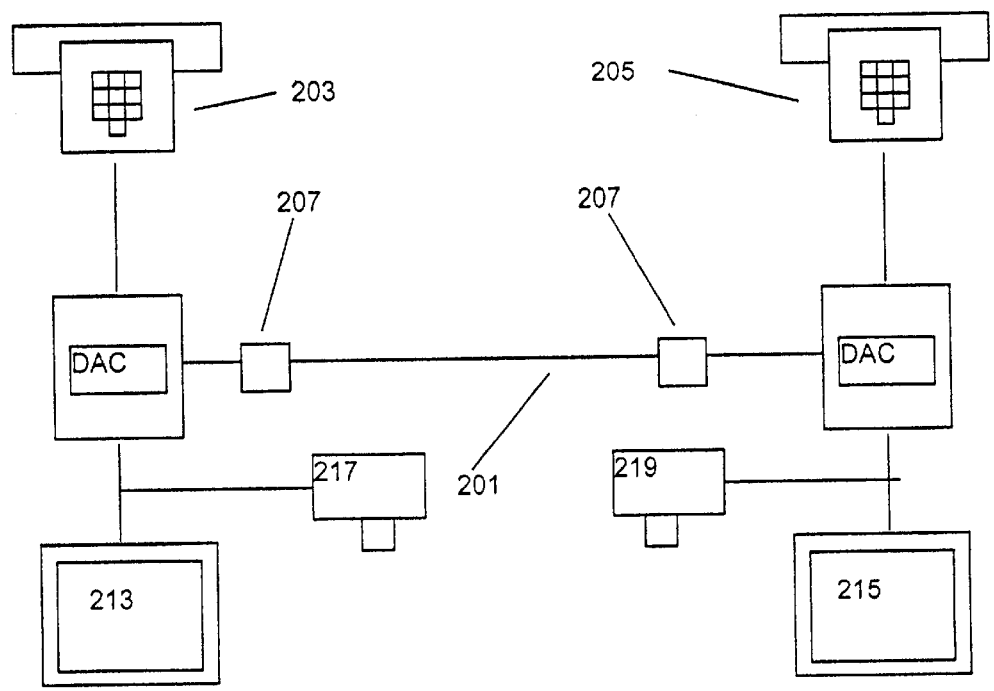
FIG. 2 shows a standard telephone system that is configured to communicate voice and video over telephone lines.

FIG. 2 is an illustration of an exemplary system according to an embodiment of the present invention. In the system in FIG. 2, two telephones 203 and 205 are in communication across a telephone line 201. The telephone line 201 has programmable analog filters 207 which may be commanded, via tones, to the maximum bandwidth. Additionally Digital to analog converters 209 and 211 are used to convert the digital video from cameras 217 and 219 into analog telephone signals to the analog telephone line 201. In addition analog to digital converters (not shown) are used to convert the video from an analog representation, as may be transmitted across phone lines, to a video representation, in order to be processed by the system and displayed on video monitors 215 and 215.

As an example, with a 56K modem, approximately 9 to 15 frames per second can be transmitted across an analog phone line, such as 201 by using current compression technology. 9 to 15 frames per second generally represents all the telephone line 210 bandwidth that is available for the transmission of bi-directional video and sound. Because 9 to 15 frames of video are available an embodiment of the present invention will allow for the transmission of 5 frames per second simultaneously in both directions. In order to conserve the limited bandwidth, a protocol may be adopted whereby unchanging portions of the video are not continuously retransmitted. That is if a portion of the video does not change over N frames it need be transmitted only once. In this way bandwidth can be further conserved. Studies have shown that the actual motion across several frames comprises worst case 40% of the frame and typically far less than 40%. By transmitting only the changing part of a frame, statistically more than 60% of the bandwidth can be saved. Therefore 5 frames per second can be transmitted bi-directionally, with bandwidth to spare. The 5 frames per second that is transmitted is then rebuilt to 30 frames per second on the receiving end.

Figure 3:
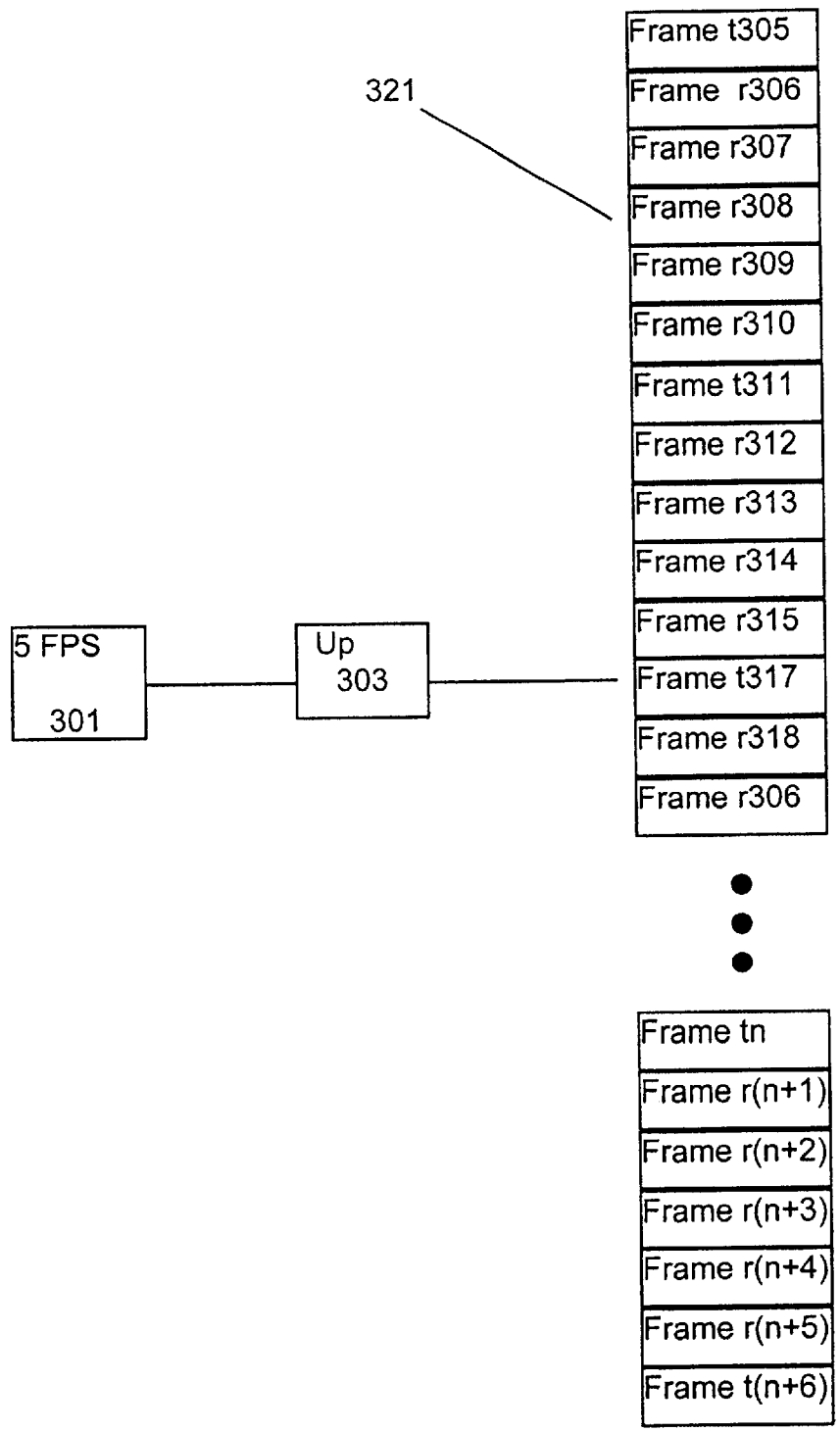
FIG. 3 illustrates graphically transmitted and created frames in accordance with one embodiment of the invention.

FIG. 3 is a graphical depiction of a receiving portion of the video system. As shown in FIG. 3, 5 frames per second 301 are received by the system. 5 frames per second are then inserted into a buffer 321, by a microprocessor or equivalent digital circuit. The frames are stored in buffer 321 as illustrated in FIG. 3. Buffer 321 represents the actual video that will be displayed. In FIG. 3 buffer 321 is divided into frames which are transmitted (which are preceded with the letter "t") and frames which are reconstructed (which are preceded with the letter "r"). So for example t305 is a transmitted frame, received by the system as part of the 5 frames per second received by block 301. T311 is also a frame received by the system in block 301. Intermediate frames r306. r307, r308, r309, and r310 are the frames that are recreated, and these frames represent frames intermediate in time between frame t305 and frame t311.

Figure 4:
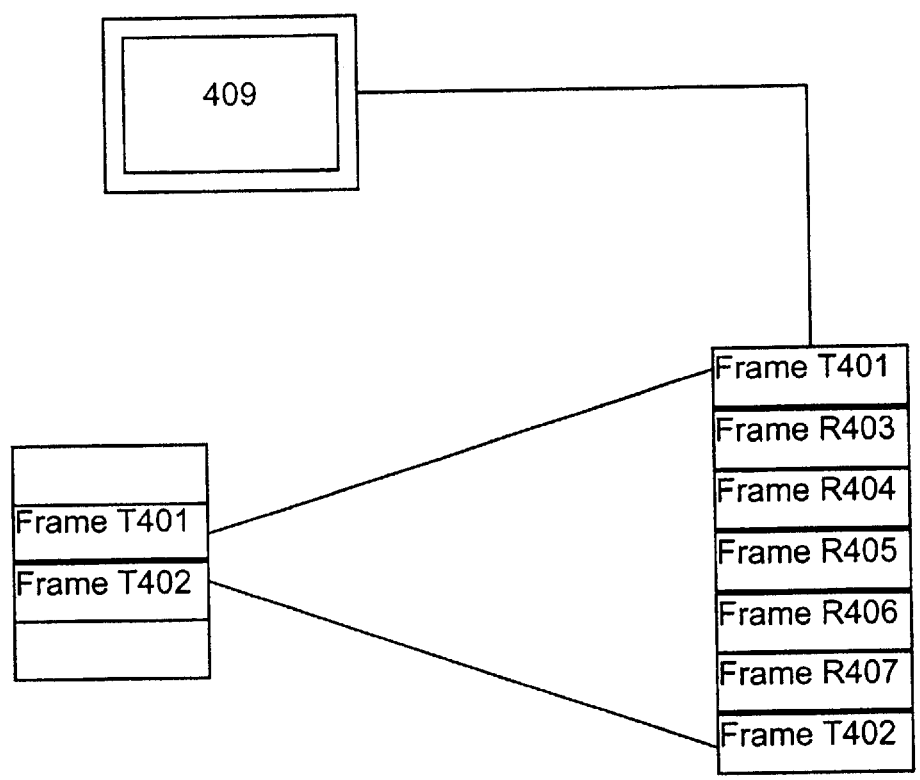
FIG. 4 illustrates graphically how intermediate frames are created between two successive frames.

In FIG. 4 two successive frames t401 and t402 are received. The system then inserts t401 and t402 into buffer 411 as shown. The intermediate frames r403 through r407 are then recreated using frame t401 and t402. The intermediate frames, r403 through r407 may also be recreated using equations of motion derived from successive frames, as described later. Several frames are used to develop a motion equation, representing the motion across the several frames, and then the motion equation is utilized, along with adjacent frames such as t401 and t402 in order to regenerate or recreate intermediate frames r403 through r407. The frames can then be streamed to a display 409 out of buffer 411 at a rate of 30 frames per second.

Figure 5:
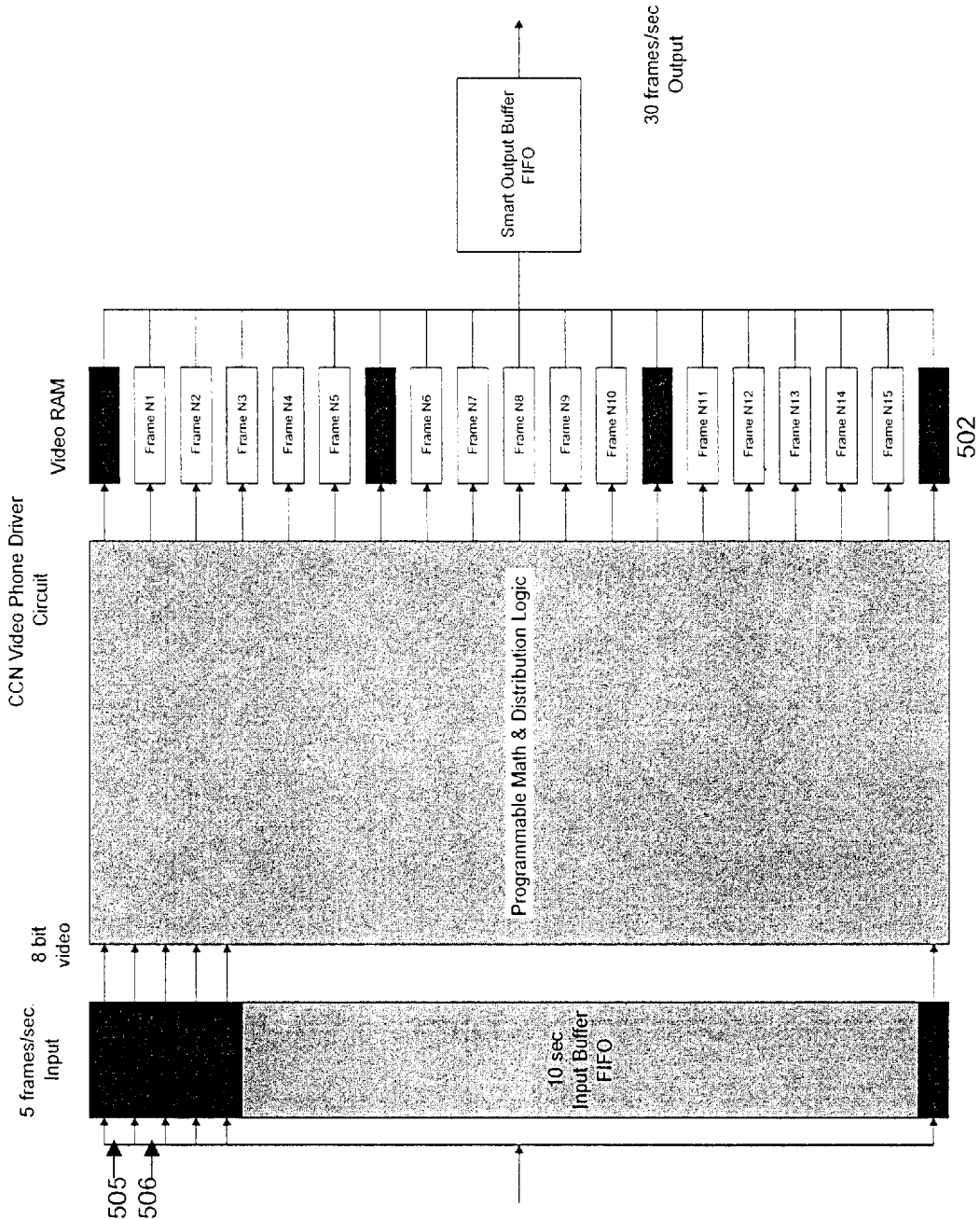
FIG. 5 shows one embodiment of a math and distribution processor used in accordance with the invention.

FIG. 5 is an illustration showing an exemplary complete system. In FIG. 5 a ten second input FIFO (First In First Out) buffer 501 is shown. Because in the exemplary system in FIG. 5 ten seconds of input video are captured, a grand total of 50 frames will have to be saved. The 10-second input FIFO buffer 501 accepts 5 frames per second from a video source. Mechanisms for generating 5 frames per second for transmission to systems, such as shown in FIG. 5 are well known in the art, and the five frame per second video can be easily generated on the transmission side. The video when received into the 10 second input FIFI buffer is then coupled into the programmable math and distribution logic circuit 503. The programmable math and distribution logic circuit 503 is the circuitry, which actually recreates the complete frames, as well as the recreated frames, which are not broadcast. For example the programmable math and distribution logic will place a first frame 505 into video RAM. The programmable math and distribution logic circuit 503 will also place a second frame 507 into frame 2. Frame 505 may be a complete frame, along with which is transmitted an indicator of which portions of frame 1 which do not change between frame 1 and frame 4 for example. Then any portion in frame 1, which does not change between frame 1, and frame 4 can then be written into frames 2, 3, and 4, without having to be retransmitted. The programmable math and distribution logic circuit 503 can then insert the received portions of transmitted frames 1, 2, 3, and 4 the portion of the video, which is changing. Once the unchanging portions of the video have been combined with the changing portions of the video in the transmitted frame, the transmitted frames are completely rebuilt with no loss. Once frames 1, 2, 3, and 4 have been rebuilt, frames n1 through n15 can be recreated.

The recreated frames along with the rebuilt transmitted frames can then be used to produce full motion video.

Figure 6:
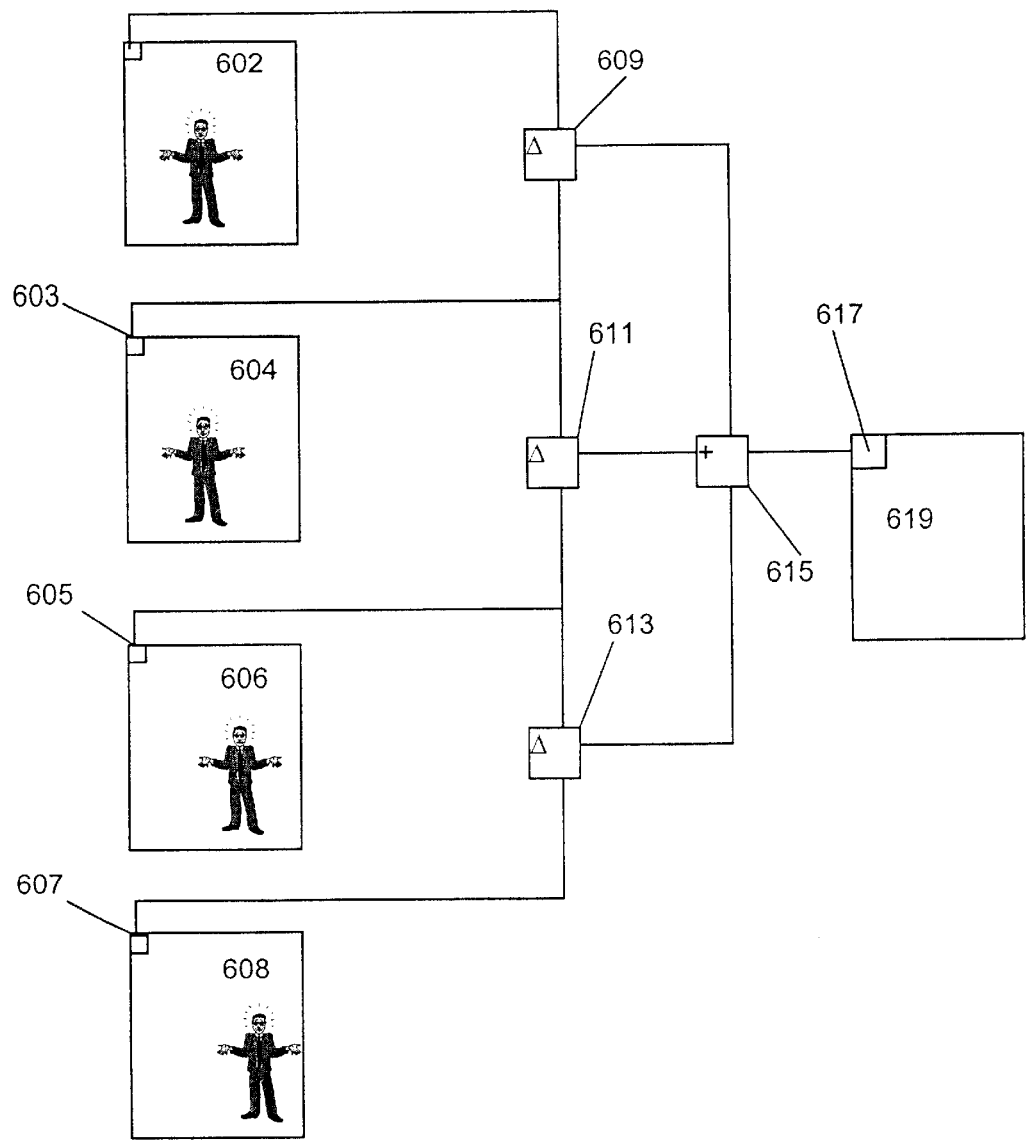
FIG. 6 illustrates determining motion in image portions of successive frames in accordance with the invention.

FIG. 6 is an illustration of 4 successively transmitted frames 602, 604, 606, and 608 along with circuitry to determine which portion of those frames have changed. Each pixel within frames 602, 604, 606, and 608 is compare with every other pixel in the same position within the frame. For example pixel 601, is compared with pixel 603 in comparator 609. The comparator 609 may be a simple hardware circuit such an exclusive OR gate. If pixel 601 is different than pixel 603 the output of comparator 609 will be a high level, whereas if pixel 601 is not different than pixel 603 the output of comparator 609 will be a low level. Similarly if pixel 603 and pixel 605 are different comparator 611 will have a high output and a low output if the pixels are the same. Similarly if pixel 605 and pixel 607 are different comparator 613 will have a high output and a low output if the pixels are the same. The output of comparators 609, 611, and 613 are then summed in a circuit 615, which may be an OR gate. The output of 615 will be high if any difference between pixels 601, 603, 605 and 607 are detected. The result then can be placed in a matrix 619. Within matrix 619 the first position will represent whether that portion of the video has changed in frame 602, 604, 606 or 608. In such a manner portions of the frames which need not be retransmitted can be identified. Conversely the portions which are changing and must be transmitted with each frame are also identified.

Figure 7:
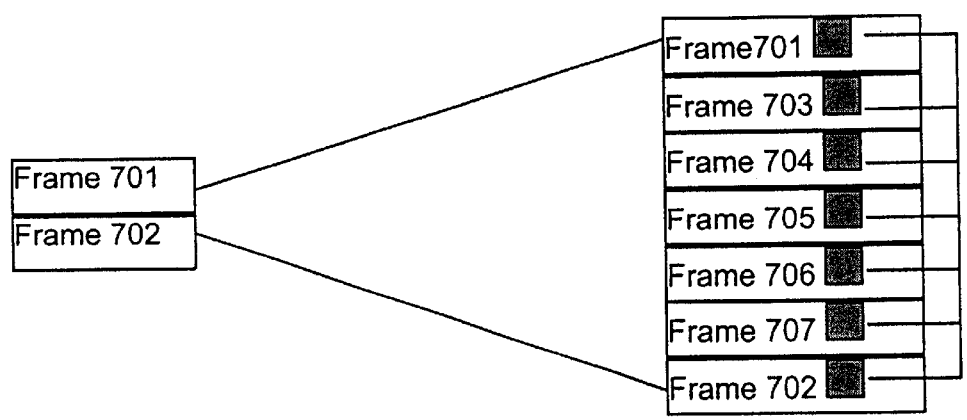
FIG. 7 illustrates creation of intermediate frames using unchanged image portions of successive frames.

FIG. 7 illustrates a mechanism by which the unchanging portions of adjacent frames are used to recreate frames on the receiving end. For example if frames 701 and 702 are successively transmitted frames and a portion of frame 705 is repeated the repeated portion can simply be written into successive frames as illustrated in FIG. 7. The unchanging portion of 705 can be written into frame 702 and also can be written into transmitted frame 702, which is transmitted without the unchanging portion 705 and also can be written into frame 702 through 707. Because the data, which is unchanging need only be broadcast once, considerable bandwidth is saved. Not only is considerable bandwidth saved, but because the unchanging portion of the video is merely written into successive frames very little processing is involved.

The data, which has not changed, may be data, which has not changed over several frames, or it may be material, which has not changed over successive frames. For example a first frame may be sent in its entirety. The second transmitted frame may contain only the pixels, which have changed from the first frame. The third transmitted frame may contain only pixels that have changed from the second frame, etc. Alternatively data over several frames can be examined simultaneously. Then the data, which has not changed over several frames, can be sent in an initial frame. Both methods can yield acceptable results and either method can be implemented with minimum computation.

For example a process which may be used over 4 transmitted frames is as follows: The initial requirement is that the frame rate being received is a fixed rate, for example 5 frames per second. All received frames will then go into a stack. The 4 frames can then be inserted into video buffers. Data that doesn't change between frames can then be copied into the four incoming frames. The recreated frames must be recreated between transmitted frames. The output may be sent out to the display one frame at a time.

Figure 8:
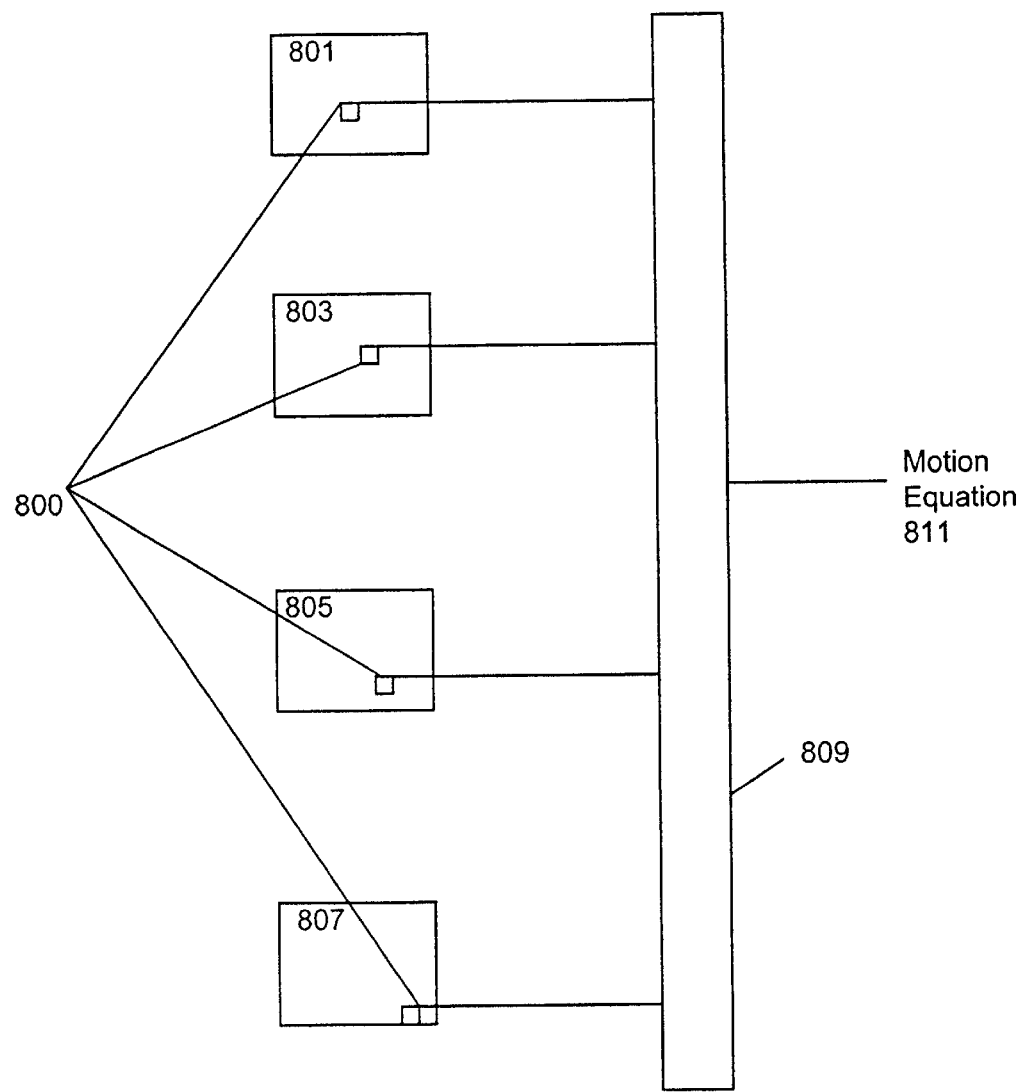
FIG. 8 is shows one method of creating motion equations in accordance with the invention.

FIG. 8 is a graphical illustration of developing the motion equation(s) that may be used in fabricating the recreated frames between the transdmitted frames.

Motion within any video frame does not proceed at random. A motion that is perceived in video frames is probably more easily described in terms of polar coordinates than in terms of rectangular coordinates. Although either coordinates system may be used. Motion within frames typically involves humans moving in arcs, circles and linearly.

For example taking four successive frames 801, 803, 805, and 807 a point 800 is identified within those frames. Because the frames 801, 803, 805, and 807 are successive, the process of identifying a point is simplified because, unless something is moving at very high speed, point 800 will not have moved very far between frames. The position of point 800 in frames 801, 803, 805, and 807 is determined. Once the position of point 800 is determined in frames 801, 803, 805, and 807 computation mechanism 809 can produce a motion equation 811, which can describe the motion of point 800. The motion equation, which has been developed over 4 transmitted frames may then be used to recreate the motion off the point 800 in the frames to be recreated between transmitted frames.

Figure 9:
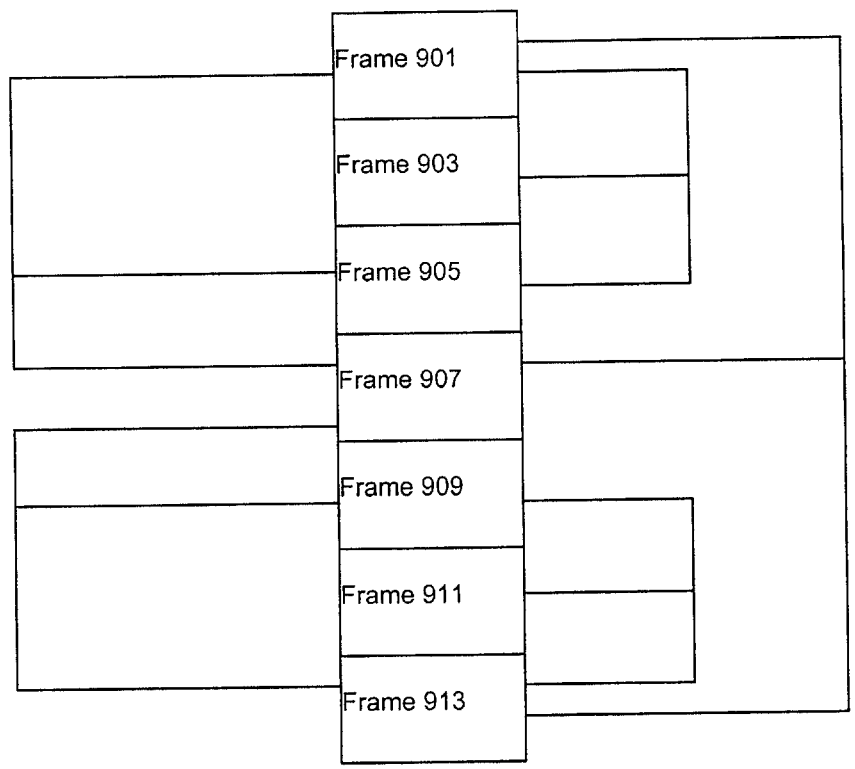
FIG. 9 shows creation of intermediate frames in accordance with the invention.

In FIG. 9 the process of recreating frames between successive received frames is illustrated. In FIG. 9 frames 901 and 913 represent transmitted frames which have been received by the system. Portions of the frames, which are not changing, have been filled in, as discussed earlier. Given the motion equation 811, frames 901 and 913 are compared. When 901 and 913 are compared the predicted location of points which are changing, from frame 901 are then calculated and inserted into frame 907. In this way frame 907 is recreated. Once frame 907 has been recreated frame 909 can be fabricated by comparing frame 907 with frame 913 and using the motion equation to compute 907.

Once frame 907 has been recreated it can be compared with frame 913 using the motion equation 811 and frame 909 can be calculated. Similarly once frame 909 has been recreated frame 911 can be recreated by comparing frame 909 with frame 913. In each case the new frame is fabricated by using the motion equation 811.

There are several ways in which the motion equation may be used to generate new frames. For example since frame 907 has been recreated frame 905 can be recreated. It can be recreated by extrapolating back from frame 907 and extrapolating forward from frame 901 as shown in FIG. 9 can create it. Additionally the two extrapolation, i.e. from frame 907 and 901 may be averaged in order to create frame 905. In other words a recreated frame may be created from a known frame, or several known frames by averaging the extrapolations from the several known frames.

Once frame 905 has been recreated, in like manner frames 901 and 905 individually or together may be examined in order to create frame 903. In such a way, using the motion equation, intermediate recreated frames, which comprise a smooth transition between transmitted and recreated frames can be fabricated. Recreated frames then, by design, can display a smooth transmission between the received frames. Because the transition is smooth the video is perceived as high quality, even though a minute inspection of the successively displayed video frames may reveal that small errors are actually present when compared with actual motion.

Such small discrepancies are inconsequential and are typically not perceived, because the eye perceives smooth motion. The eye does not perceive that portions of the video may be displaced and minor distortion is present.

Such distortions are typically inherent in the majority of cathode ray tube displays. For example in a common television picture when bright objects are displayed the picture raster invariably distorts. Television pictures therefore continually display minor changing distortions as a part of the picture. Just as these minor changing distortions are not perceived with television pictures, they are also ignored in the present described system.

The invention may be embodied in other specific forms without departing from the spirit or essential characteristics of the invention. The described embodiments are to be considered in all respects only illustrative and not restrictive and the scope of the invention is, therefore, indicated by the appended claims rather than by the foregoing description. All changes which come within the meaning of equivalency of the claims are to be embraced within their scope.

What is claimed is:

1. An apparatus for creating at least one intermediate image frame based on at least two image frames in a video communications system, the apparatus comprising:
    a memory, configured to store pixel information related to first and second image frames captured by a video device and transmitted by a transmitter, wherein the first frame comprises data representing substantially an entire first image and the second frame comprises data representing at least a portion of an entire second image; and
    a receiver configured to receive the transmitted first and second image frames from the transmitter, the receiver comprising a processor, electrically connected to the memory, wherein the processor is configured to determine a location of an intermediate image portion based on at least the respective locations of the received portion of the second frame and its corresponding portion in the first frame.

2. The apparatus of claim 1, wherein the processor is configured to identify a portion of the second image frame that remained unchanged during a predetermined period of time.

3. The apparatus of claim 2, wherein the processor is configured to place the unchanged portion in an intermediate image frame.

4. The apparatus of claim 3, wherein the processor is configured to place the intermediate image portion in addition to the unchanged portion in the intermediate image frame.

5. The apparatus of claim 4, wherein the transmitter is configured to transmit to the receiver data representing only image portions that have changed in the second frame when compared to the first frame image.

6. The apparatus of claim 5, wherein the transmitter communicates to the receiver an indicator that identifies the corresponding portion of the image that was changed.

7. The apparatus of claim 5, wherein the transmitter communicates to the receiver pixel information related to the identified portion.

8. The apparatus of claim 5, wherein each of the transmitter and receiver comprises a telephone unit.

9. A method of creating at least one intermediate image frame based on at least two image frames in a video communications system, the method comprising:
    receiving first and second image frames from a transmitter, the first image frame comprising data representing substantially an entire first image and the second frame comprising data representing at least a portion of an entire second image; and
    determining a location of an intermediate image portion based on at least the respective locations of the received portion of the second frame and its corresponding portion in the first frame.

10. The method of claim 9, wherein identifying the second image portion includes identifying a portion of the second image frame that remained unchanged during a predetermined period of time.

11. The method of claim 10, further comprising placing the unchanged portion in an intermediate image frame.

12. The method of claim 11, further comprising placing the intermediate image portion with the unchanged portion in the intermediate image frame.

13. The method of claim 12, further comprising communicating from the transmitter to a receiver data representing only image portions that have changed in the second image when compared to the first image.

14. The method of claim 13, further comprising communicating to the receiver an indicator that identifies the corresponding portion of the image that was changed.

15. The method of claim 13, further comprising communicating pixel information related to the second image portion to the receiver.

16. An apparatus for creating at least one intermediate image frame based on at least two image frames in a video communications system, the apparatus comprising:
    means for receiving first and second image frames from a transmitter, the first image frame comprising data representing substantially an entire first image and the second frame comprising data representing at least a portion of an entire second image;
    means for identifying a portion of the second image frame, provided that the identified portion was changed during a period of time; and
    means for determining a location of an intermediate image portion based on at least the respective locations of the identified portion and its corresponding portion in the first frame.

17. The apparatus of claim 16, wherein the identifying means includes means for identifying a portion of the second image frame that remained unchanged during a predetermined period of time.

18. The apparatus of claim 17, further comprising means for placing the unchanged portion in an intermediate image frame.

19. The apparatus of claim 18, further comprising means for placing the intermediate image portion in addition to the unchanged portion in the intermediate image frame.

20. The apparatus of claim 19, further comprising means for communicating the first image frame from a transmitter to a receiver.

* * * * *